April 5, 1927.
C. T. CROCKER
1,623,780
FLUID PRESSURE OPERATED DEVICE
Filed Nov. 17, 1921      2 Sheets-Sheet 1
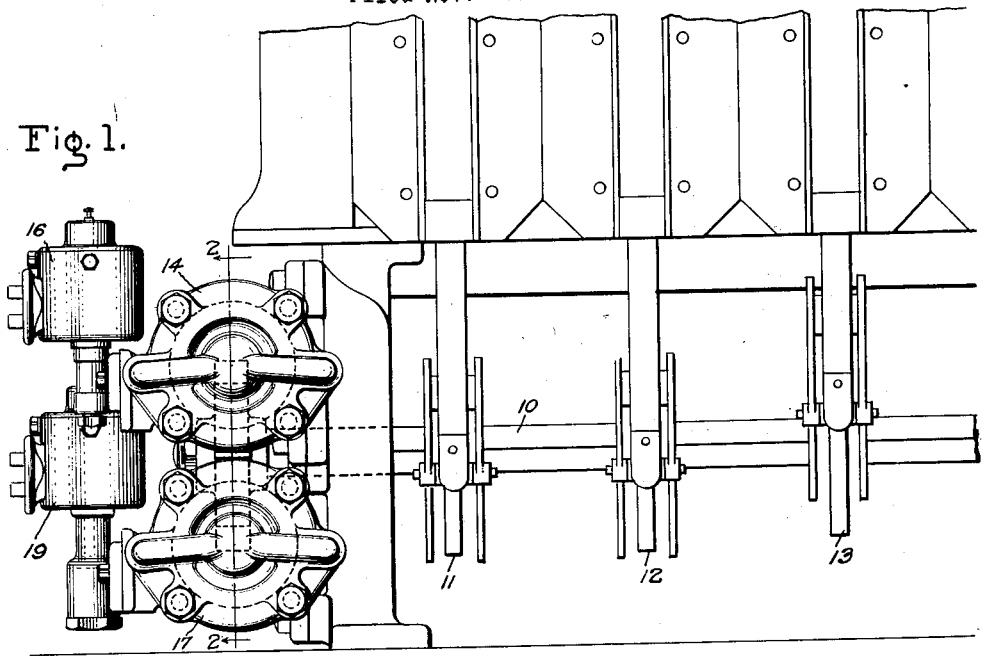
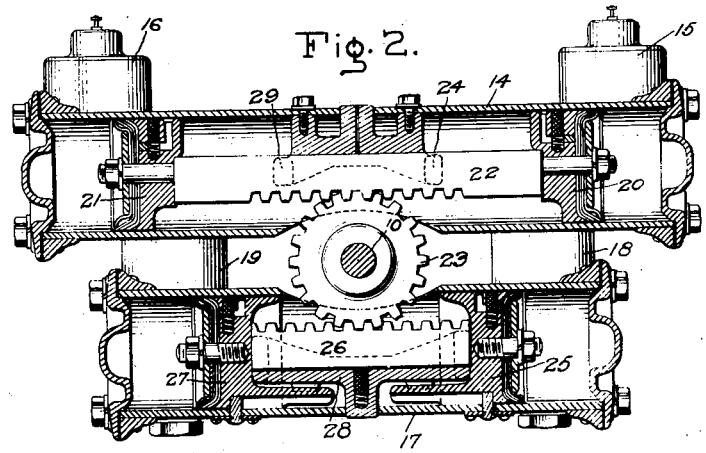
Inventor:
Clarence T. Crocker,
by Albert E. Davis
His Attorney.

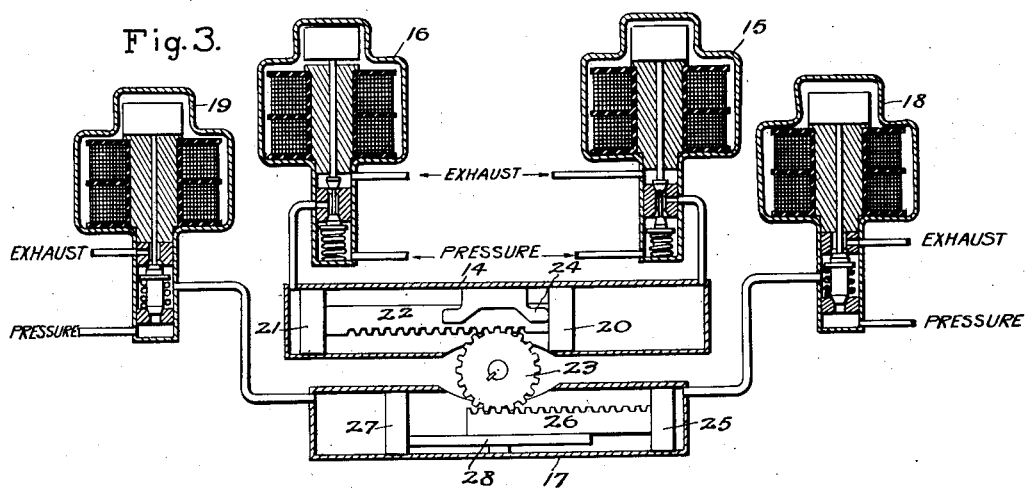
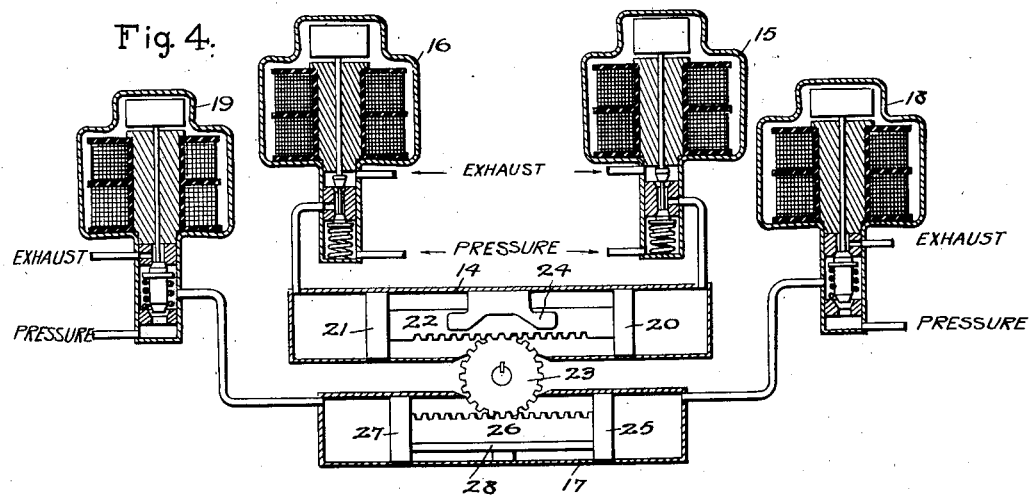
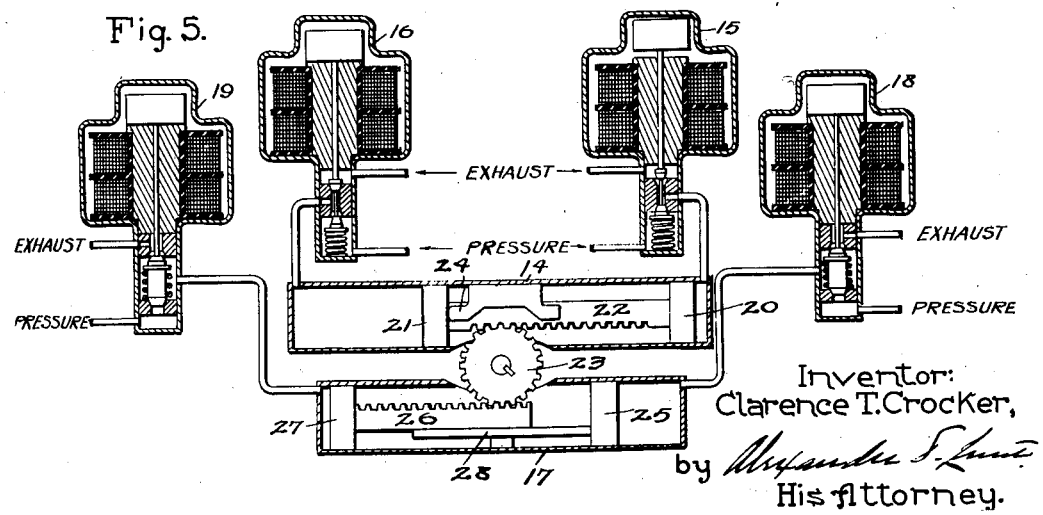

Patented Apr. 5, 1927.

1,623,780

UNITED STATES PATENT OFFICE.

CLARENCE T. CROCKER, OF SCHENECTADY, NEW YORK, ASSIGNOR TO GENERAL ELECTRIC COMPANY, A CORPORATION OF NEW YORK.

FLUID-PRESSURE-OPERATED DEVICE.

Application filed November 17, 1921. Serial No. 515,996.

My invention relates to devices which are operated between a plurality of positions by means of a fluid pressure motor such, for example, as a pneumatically operated controller. The invention is particularly directed to improvements whereby the movable device is positively operated to and exactly stopped at a predetermined position or positions.
One of the difficulties experienced in the operation of devices of the above character is that of getting the device to stop exactly at a desired predetermined position because of the fact that the fluid pressure motor is apt to "over-shoot"; that is, run a short distance beyond the desired stopping point. Thus, for instance, in a controller operated each way from a predetermined position to other definite positions by a reversible pneumatic motor, difficulty is experienced in returning the controller from either portion of the definite positions exactly to the middle predetermined position.

In carrying my invention into effect in a controller operated each way from a predetermined position to other definite positions by a pneumatic motor, I provide a second or auxiliary pneumatic motor cooperating with means for exactly determining the stopping position of the motor, for example a mechanical stop for operating the controller to the desired predetermined position after operation to other positions by the main pneumatic motor. This auxiliary pneumatic motor may be designed for the single purpose of obtaining an accurate stop for the controller. Thus, the auxiliary pneumatic motor has two pistons operatively connected to the controller and having relative movement with respect thereto. When the controller is moved by the main pneumatic motor in either direction from the predetermined mid-position to a definite position, one of the pistons of the auxiliary pneumatic motor is also moved, so that when pneumatic pressure is released from the main motor and applied to the auxiliary motor, this piston of the auxiliary motor will operate the controller to the predetermined mid-position.
The other piston of the auxiliary motor is pressed against a stop by the gas under pressure and serves to arrest the controller exactly at the mid-position.

For a better understanding of my invention, reference is had to the accompanying drawings wherein I have shown an embodiment of the invention in a multi-position pneumatically operated controller of the character described above for the purpose of explaining the principles thereof. Referring to the drawings, Fig. 1 is a side view of a pneumatic motor operated electric controller, Fig. 2 is a sectional view of the pneumatic motors shown in Fig. 1 taken on the section line 2—2, looking in the direction of the arrows, and Figs. 3, 4 and 5 are diagrammatic illustrations of the relative positions of the several operative parts of the pneumatic motors during different phases of operation.

Referring first to Figs. 1 and 2, the controller operated by the pneumatic motors comprises the shaft 10 to which cams 11, 12 and 13 are secured for operating switch mechanism (not shown). The shaft 10 is operated by means of the main pneumatic motor 14. This motor is controlled by means of the electromagnetic valves 15 and 16 which respectively control passages leading from a source of gas under pressure and also passages leading to the exhaust. These passages are not shown in detail for the reason that they are not of the essence of my invention. The second or auxiliary pneumatic motor 17 is provided for operating the controller exactly to its predetermined mid-position. This second or auxiliary motor 17, in the preferred form shown in the drawing, is reversible and comprises a cylinder and a pair of trunk pistons 25 and 27 which reciprocate respectively between the right and left hand ends of the cylinder and a central stop 28. A rack 26, of substantially the same length as stop 28, is slidably supported between the mechanically independent reciprocating pistons 25 and 27 in engagement with a pinion 23 keyed on the end of the controller shaft 10. The rack 26 has no mechanical connection to either piston 25 or 27 but when moved by rotation of pinion 23 to the right or left from the central position shown in Fig. 2 butts against one or the other piston to push the same away from the stop 28. The return of the rack 26 to the central position is controlled by electromagnetic valves 18 and 19, located at the respective ends of the cylinder of the auxiliary motor 17, and respectively controlling inlet passages (not shown) from a source of gas under pressure

(not shown) and also exhaust passages (not shown).

By reference to Fig. 2, it will be observed that the pneumatic motor 14 is provided with two pistons 20 and 21 connected to a rack 22 which is connected to a pinion 23 on the end of the shaft 10 of the controller. When gas under pressure is admitted to the right-hand end of the pneumatic motor 14 by the operation of the electromagnetic valve 15 and the left-hand end of the cylinder of the pneumatic motor is connected to atmosphere by the operation of the electromagnetic valve 16, the piston 20 will move the rack 22 toward the left until the piston 20 comes into engagement with the stop 24. The pinion 23 and the shaft 10 are thereby rotated counterclockwise from the predetermined mid-position (that shown in Fig. 2) to a definite position as shown in Fig. 3. A certain relation of the circuits controlled by the controller is thereby established. When the pinion 23 is thus moved counter-clockwise, both ends of the cylinder of auxiliary pneumatic motor 17 are connected to atmosphere by operation of electromagnetic valves 18 and 19 and the piston 25 of the auxiliary pneumatic motor is moved by means of the rack 26 toward the right thus exhausting gas from the right hand end of the auxiliary motor through the valve 18. During this operation the other piston 27 of the pneumatic motor remains stationary against the left hand end of stop 28. The relative positions of the pistons and rack of the main pneumatic motor 14 and of the auxiliary pneumatic motor 17 after the completion of the counter clockwise rotation of pinion 23 as above described, is shown diagrammatically in Fig. 3, as well as the relative positions which the electromagnetic valves 15, 16, 18 and 19 occupy during this operation. If now the electromagnetic valves 15 and 16 should be operated to respectively exhaust the gas under pressure in the right-hand end of the cylinder of the main motor 14 and admit gas under pressure to the left hand of this cylinder, it will be evident that the piston 21 of the main motor will return the rack 22 towards the right and rotate the pinion 23 and shaft 10 in a clockwise direction. This operation may be continued until the piston 21 comes into engagement with stop 29 and it will be understood that by properly operating either valve 16 to exhaust the gas under pressure from the left hand end or valve 15 to admit gas under pressure to the right hand end it is possible to stop the movement of rack 22 when the pinion 23 and shaft 10 has reached the predetermined mid position shown in Fig. 2. But as pointed out above, considerable difficulty may be experienced in getting the rack 22 to stop movement with the controller shaft 10 exactly in the predetermined position by operation of either electromagnetic valve 15 or 16 as just described. If however, after operation to the position shown in Fig. 3, the gas under pressure should be exhausted from the right-hand end of the cylinder of the main motor 14 by the operation of the electromagnetic valve 15, and gas under pressure be admitted to both ends of the auxiliary motor by the operation of the electromagnetic valves 18 and 19, the piston 27 will be forced against the left-hand end of the stop 28, and the piston 25 will move the rack 26 to the left until this piston also comes into engagement with the right-hand end of the stop 28. The pinion 23 will thereby be rotated in the clockwise direction to return the controller to the exact predetermined mid-position shown in Fig. 2. The relative positions of the racks, pistons and electromagnetic valves of the two motors at the termination of this phase of operation is shown in Fig. 4. The controller will be returned exactly to the predetermined position because of the fact that the piston 27 will serve as a stop for the rack 26, and the piston 25 will be arrested at the exact mid-position. "Over-shooting" of the controller beyond the mid-position is thereby prevented.

When it is desired to rotate the controller shaft clockwise from the predetermined mid-position to a definite position, gas under pressure is admitted to the left-hand end of the main motor 14 by the operation of the electromagnetic valve 16, the electromagnetic valve 15 maintaining the connection to exhaust for the right-hand end of the cylinder of the main motor. The piston 21 will thereby operate the rack 22 to the right until this piston comes into engagement with the stop 24. The pinion 23 will slide the rack 26 of the auxiliary motor to the left, carrying with it the piston 27, the piston 25 meanwhile remaining stationary against the right hand end of stop 28. Fig. 5 shows the relative position of the several parts upon completion of this operation of the main motor. In order to return the controller exactly to the mid-position, both ends of the cylinder of the main motor 14 are connected to exhaust by the electromagnetic valves 15 and 16, and gas under pressure is admitted to both ends of the auxiliary motor by the operation of the valves 18 and 19. The piston 27 now serves to slide the rack 26 to the right, thereby rotating the pinion 23 and the shaft 10 counter-clockwise to the exact mid-position, the piston 25 of the auxiliary motor in this case serving as the stop for arresting the tendency of the auxiliary motor to "overshoot."

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a device operable to a plurality of positions, or a fluid pressure motor for operating the same from an intermediate one of said positions to any selected one of the remaining positions and a second fluid pressure motor having a plurality of separately operable pistons, each for operating the said device from a different direction to said intermediate position.

2. The combination with a device operable to a plurality of positions, of a fluid pressure motor for operating the same each way from a predetermined position to other definite positions, and a second fluid pressure motor having a pair of separately operable pistons, each for operating the said device from a corresponding portion of the said definite positions to the said predetermined position.

3. The combination with a device operable to a plurality of positions, of a reversible fluid pressure motor for operating the same from a predetermined one of said positions to any selected one of the remaining positions, a mechanical stop, and a second reversible fluid pressure motor cooperating with said mechanical stop for returning and stopping the device exactly at said predetermined positions.

4. The combination with a device operable to a plurality of positions, of a reversible fluid pressure motor for operating the same each way from a predetermined position, a mechanical stop, and a second reversible fluid pressure motor comprising a pair of mechanically independent pistons cooperating with said mechanical stop for returning and stopping the device exactly at the said predetermined position.

5. The combination with a device operable to a plurality of positions, of a plurality of mechanical stops, a plurality of reversible fluid pressure motors mechanically connected to the device and each cooperating with a different one of said mechanical stops for selectively operating and stopping the controller at different predetermined positions.

6. The combination with a device operable to a plurality of positions, of a plurality of mechanical stops, a plurality of reversible fluid pressure motors for operating the said device to different positions determined by said stops, and electromagnetically actuated valves for admitting pressure to one motor and exhausting pressure from the other motors to effect the operation of the said device in each direction exactly to a predetermined one of said positions.

7. The combination with a controller having a shaft, of a pneumatic motor having a piston directly connected to the said shaft for operating the same each way from a predetermined position to other definite positions, and a second pneumatic motor having a plurality of pistons operatively connected to the said shaft, one of said pistons serving as a stop for the shaft and the other of which returns the said shaft to the said predetermined position.

8. The combination with a controller having a shaft, of a pneumatic motor having a plurality of pistons directly connected to the said shaft, one of said pistons for operating the said shaft in one direction from a predetermined position to a definite position and the other of said pistons for operating the shaft in the other direction to another definite position, and a second pneumatic motor having a plurality of pistons operatively connected to the said shaft and relatively movable with respect thereto, the said pistons being arranged so that one is moved with the said shaft depending on the definite position to which the shaft is moved and then returns the shaft to the predetermined position, the other piston of the second pneumatic motor then serving as a stop for arresting the motion of the shaft at the said predetermined position.

9. The combination with a controller having a shaft for operating switch mechanism, a pinion on the shaft, a pneumatic motor having a rack cooperating with the said pinion for rotating the shaft each way from a predetermined intermediate position to a definite position, pistons connected to ends of the said rack for operating the said shaft to the said definite positions, a stop for limiting the travel of the pistons at the said definite positions, a second pneumatic motor having a second rack operatively connected to the said pinion and a piston cooperating with each end of the second rack for returning the said shaft to the said predetermined position, the arrangement being such that the other piston of the second motor serves as a stop for the said second rack.

In witness whereof, I have hereunto set my hand this 16th day of November, 1921.

CLARENCE T. CROCKER.